(12) United States Patent
Funai (10) Patent No.: US 7,628,095 B2
(45) Date of Patent: Dec. 8, 2009

(54) BICYCLE SHIFTING MECHANISM

(75) Inventor: Shingo Funai, Sakai (JP)

(73) Assignee: Shimano Inc., Osaka (JP)

( * ) Notice: Subject to any disclaimer, the term of this patent is extended or adjusted under 35 U.S.C. 154(b) by 442 days.

(21) Appl. No.: 11/430,863

(22) Filed: May 10, 2006

(65) Prior Publication Data

US 2007/0261507 A1 Nov. 15, 2007

(51) Int. Cl.
*F16C 1/10* (2006.01)
*G05G 11/00* (2006.01)
*B62M 25/04* (2006.01)

(52) U.S. Cl. .............. 74/502.2; 74/473.14; 74/489

(58) Field of Classification Search .......... 74/144, 74/473.14, 489, 502.2, 473.15
See application file for complete search history.

(56) References Cited

U.S. PATENT DOCUMENTS

| | | | | |
|---|---|---|---|---|
| 5,012,692 A | * | 5/1991 | Nagano | 74/473.14 |
| 5,203,213 A | * | 4/1993 | Nagano | 74/473.14 |
| 5,241,878 A | | 9/1993 | Nagano | |
| 5,257,683 A | | 11/1993 | Romano | |
| 5,400,675 A | | 3/1995 | Nagano | |
| 5,676,022 A | * | 10/1997 | Ose | 74/502.2 |
| 5,682,794 A | * | 11/1997 | Shibata | 74/489 |
| 5,802,923 A | * | 9/1998 | Hara | 74/473.13 |
| 5,957,002 A | * | 9/1999 | Ueng | 74/502.2 |
| 6,066,057 A | | 5/2000 | Nakamura et al. | |
| 6,073,730 A | | 6/2000 | Abe | |
| 6,216,078 B1 | | 4/2001 | Jinbo et al. | |
| 6,502,477 B1 | | 1/2003 | Assel | |
| 6,647,823 B2 | | 11/2003 | Tsumiyama et al. | |
| 2003/0177855 A1 | * | 9/2003 | Tsumiyama et al. | 74/502.2 |
| 2004/0005947 A1 | | 1/2004 | Shahana et al. | |
| 2004/0144193 A1 | * | 7/2004 | Sato et al. | 74/502.2 |
| 2004/0237697 A1 | * | 12/2004 | Kawakami | 74/501.6 |
| 2005/0126329 A1 | | 6/2005 | Blaschke | |

FOREIGN PATENT DOCUMENTS

| | | |
|---|---|---|
| EP | 0 647 557 A2 | 4/1995 |
| EP | 1 245 483 A2 | 10/2002 |
| EP | 1 440 878 A2 | 7/2004 |
| EP | 1 481 883 A1 | 12/2004 |
| EP | 1 652 768 A2 | 5/2006 |

* cited by examiner

*Primary Examiner*—Richard W L Ridley
*Assistant Examiner*—Thomas Diaz
(74) *Attorney, Agent, or Firm*—Global IP Counselors, LLP (57) ABSTRACT

A bicycle shifting mechanism is provided with a wire takeup member and a positioning mechanism. The wire takeup member rotates about a rotational axis to wind and release an inner wire of a shift cable. The positioning mechanism selectively maintains the takeup member in one of a plurality of predetermined shift positions. The positioning mechanism has a first movable positioning member, a second movable positioning member separately movable relative to the first positioning member, a first toothed segment that moves with the takeup member, a second toothed segment that moves with the takeup member. The first and second movable positioning members alternately engage and disengage one of the first and second toothed segments, respectively, as the first and second movable positioning members are moved to perform a shifting operation between sequential shift positions.

14 Claims, 8 Drawing Sheets

BICYCLE SHIFTING MECHANISM

BACKGROUND OF THE INVENTION

1. Field of the Invention

This invention generally relates to a bicycle shifting mechanism. More specifically, the present invention relates to a bicycle shifting mechanism that utilizes a pair of positioning members during a wire releasing operation.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for shifting have been extensively redesigned in recent years.

Currently, there are many types of cable operated shifting devices currently being installed on bicycles. For example, some cable operated shifting devices have a pair of shift levers and a cable winding mechanism that rotates via a ratchet mechanism. With conventional cable operated shifting devices of this type, operation of one of the shift lever causes the cable winder to rotate via the ratchet mechanism in one direction by one gear at a time. As a result, the cable is wound around the cable winder, and a shift is made by the shift mechanism from one gear to the next gear. Operation of the other shift lever causes the ratchet mechanism to be released and the cable winder to rotate in the other direction by one gear at a time. As a result, the cable that was wound on the cable winder is played out, and a shift is made in the opposite direction by the shift mechanism.

More recently, some cable operated shifting devices have been developed that allow multiple gear shifts in a single operation of one of the shift levers. These prior shifting devices can be complicated and expensive to manufacture and assemble. Furthermore, these prior shifting devices are sometimes heavy and/or cumbersome.

In view of the above, it will be apparent to those skilled in the art from this disclosure that there exists a need for an improved bicycle shifting mechanism. This invention addresses this need in the art as well as other needs, which will become apparent to those skilled in the art from this disclosure.

SUMMARY OF THE INVENTION

One object of the present invention is to provide a bicycle shifting mechanism for releasing a wire of a shift cable with the bicycle shifting mechanism being simple to operate such that a single gear shift or multiple gear shifts can be performed in a single gear shifting operation.

Another object of the present invention is to provide a bicycle control device for shifting a bicycle transmission that is relatively simple and inexpensive to manufacture and assemble.

The foregoing objects can basically be attained by providing a bicycle shifting mechanism that basically comprises a wire takeup member and a positioning mechanism. The wire takeup member is configured and arranged to rotate about a rotational axis. The positioning mechanism is configured and arranged to selectively maintain the takeup member in one of a plurality of predetermined shift positions. The positioning mechanism includes a first movable positioning member, a second movable positioning member separately movable relative to the first positioning member, a first toothed segment configured to move with the takeup member, a second toothed segment configured to move with the takeup member. The first and second movable positioning members are configured and arranged to alternately engage and disengage one of the first and second toothed segments, respectively, as the first and second movable positioning members are moved to perform a shifting operation between sequential shift positions of the predetermined shift positions. With this arrangement, a single gear shift or multiple gear shifts can be performed in a single gear shifting operation by the alternate movement of the first and second movable positioning members.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are-provided for illustration only and not for the purpose of limiting the invention as defined by the appended claims and their equivalents.

Figure 1:
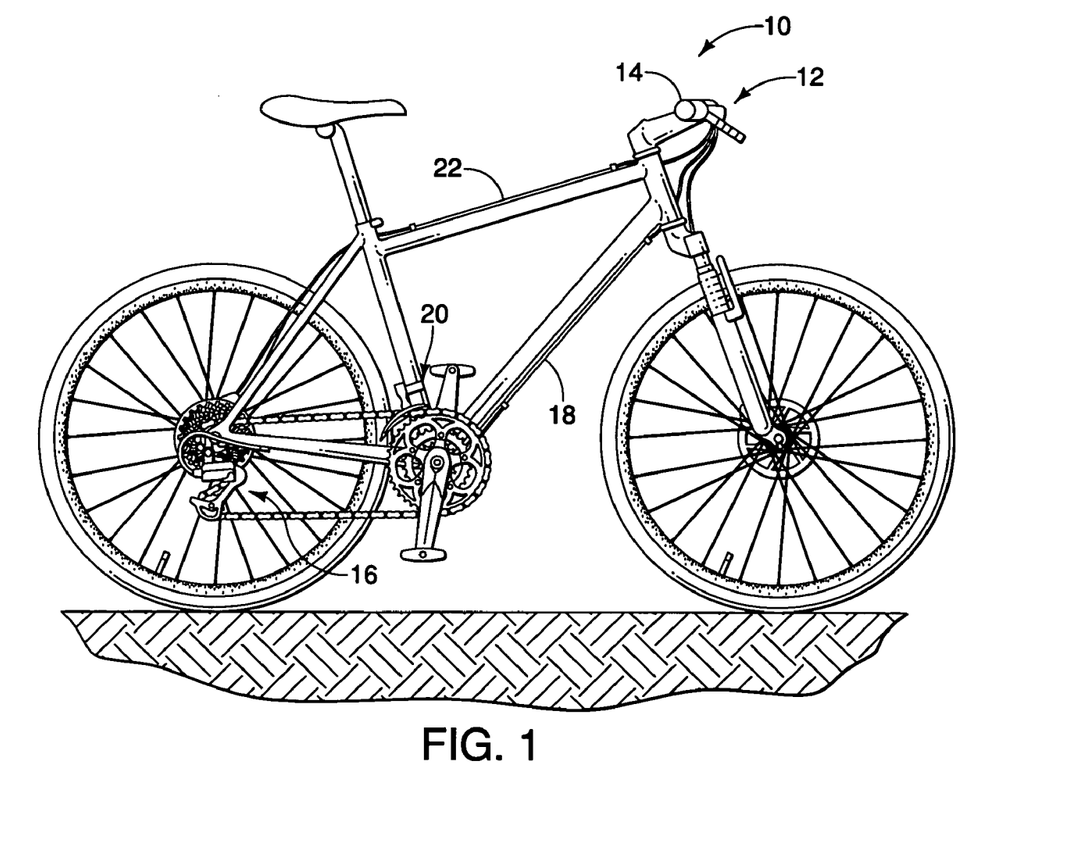
FIG. 1 is a side elevational view of a bicycle equipped with a pair of control devices or shifters (only one shown) in accordance with one embodiment of the present invention.

Referring initially to FIG. 1, a bicycle 10 is illustrated with a bicycle control device or shifter 12 in accordance with one embodiment of the present invention. The bicycle shifter 12 is a right hand side control device that is mounted on a bicycle handlebar 14 so that it can be operated by the rider's right hand. The bicycle shifter 12 is preferably operatively coupled to a rear derailleur 16 via a shift control cable 18.

Preferably, the bicycle 10 includes a left hand side shifter (not shown) that is substantially identical to the bicycle shifter 12, except for the shifting mechanism has been modified to reduce the number of gears that can be shifted. Preferably, the left hand side shifter is operatively coupled to a front derailleur 20 via a shift control cable 22. Alternatively, the control devices can be switched so that the rider can operate the rear derailleur 16 and the front derailleur 20 with opposite hands. In any event, the left hand side shifter is essentially identical in construction and operation to the bicycle shifter 12, except that it is a mirror image of the bicycle shifter 12 and the number of shift positions for the left hand side shifter is different. Thus, only the bicycle shifter 12 will be discussed and illustrated herein. Preferably, the cables 18 and 22 are conventional bicycle cables that have an outer casing the covers an inner wire. For example, the shift control cable 18 has an inner wire 18a and an outer casing 18b.

Since most of the parts of the bicycle 10 are well known in the art, the parts of the bicycle 10 will not be discussed or illustrated in detail herein, except for the parts that relate to the present invention. In other words, only the parts related to the bicycle shifter 12 will be discussed and illustrated in detail herein. Moreover, various conventional bicycle parts such as brakes, additional sprockets, derailleurs, etc., which are not illustrated and/or discussed in detail herein, can be used in conjunction with the present invention.

Figure 2:
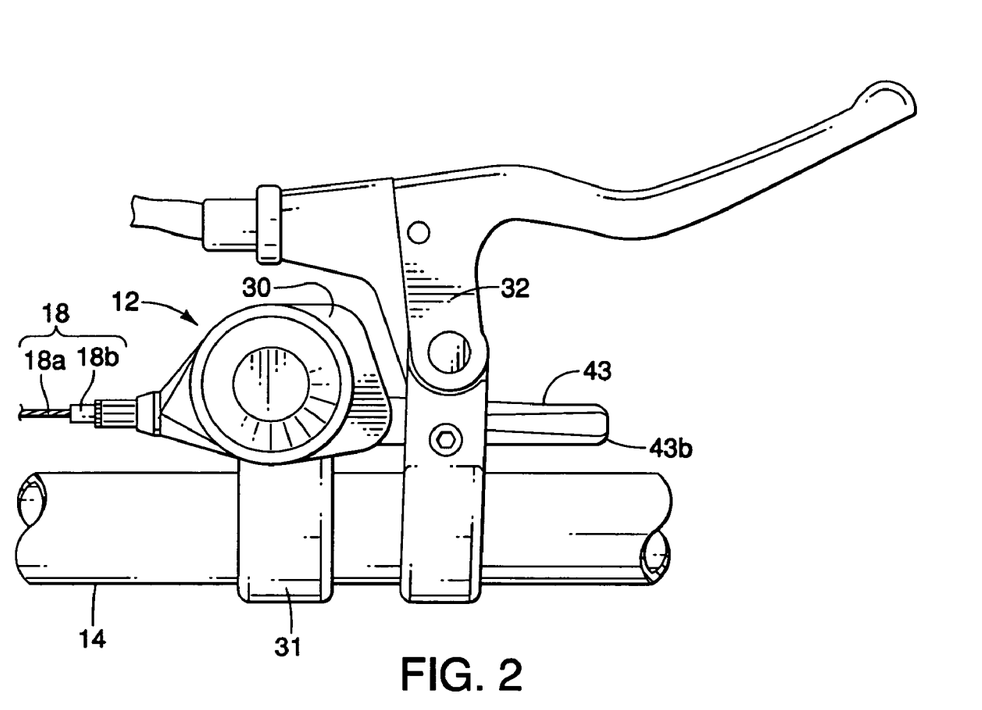
FIG. 2 is a top plan view of the right bicycle shifter illustrated in FIG. 1, with the operating members (shift levers) in the rest position.

Referring now to FIG. 2, the bicycle shifter 12 is illustrated in the rest position and attached to the right hand side of the bicycle handlebar 14. The bicycle shifter 12 has a housing 30 with a bicycle handlebar mounting portion 31 for mounting the bicycle shifter 12 to the bicycle handlebar 14 in a conventional manner adjacent to a brake lever 32. Alternatively, the bicycle shifter 12 can be integrated with the brake lever 32 as needed and/or desired.

Figure 3:
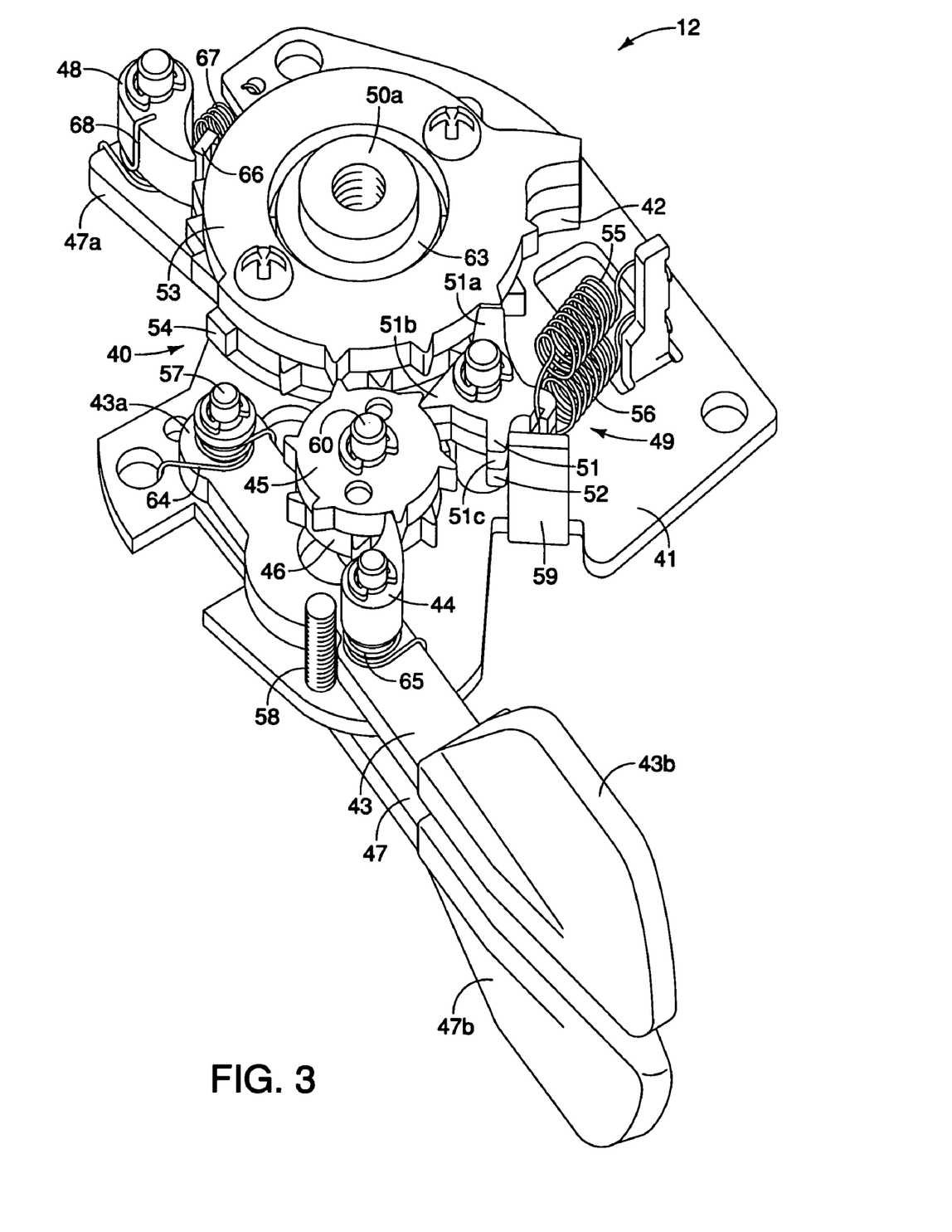
FIG. 3 is an enlarged perspective view of selected internal parts of the bicycle shifting mechanism for the bicycle shifter illustrated in FIGS. 1 and 2 in accordance with the present invention.

Referring now to FIG. 3, inside the housing 30, the bicycle shifter 12 has a bicycle shifting mechanism 40 for pulling and releasing the inner wire 18a of the shift cable 18. The bicycle shifting mechanism 40 is configured and arranged to perform either a single gear shift or multiple gear shifts in a single gear shifting (winding or releasing) operation. In other words, the bicycle shifting mechanism 40 is configured and arranged such that the inner wire 18a of the shift control cable 18 can be pulled and released to selectively effect either a single-stage gear shift operation or a multiple-stage gear shift operation in a single progress shifting operation as explained below.

Figure 4:
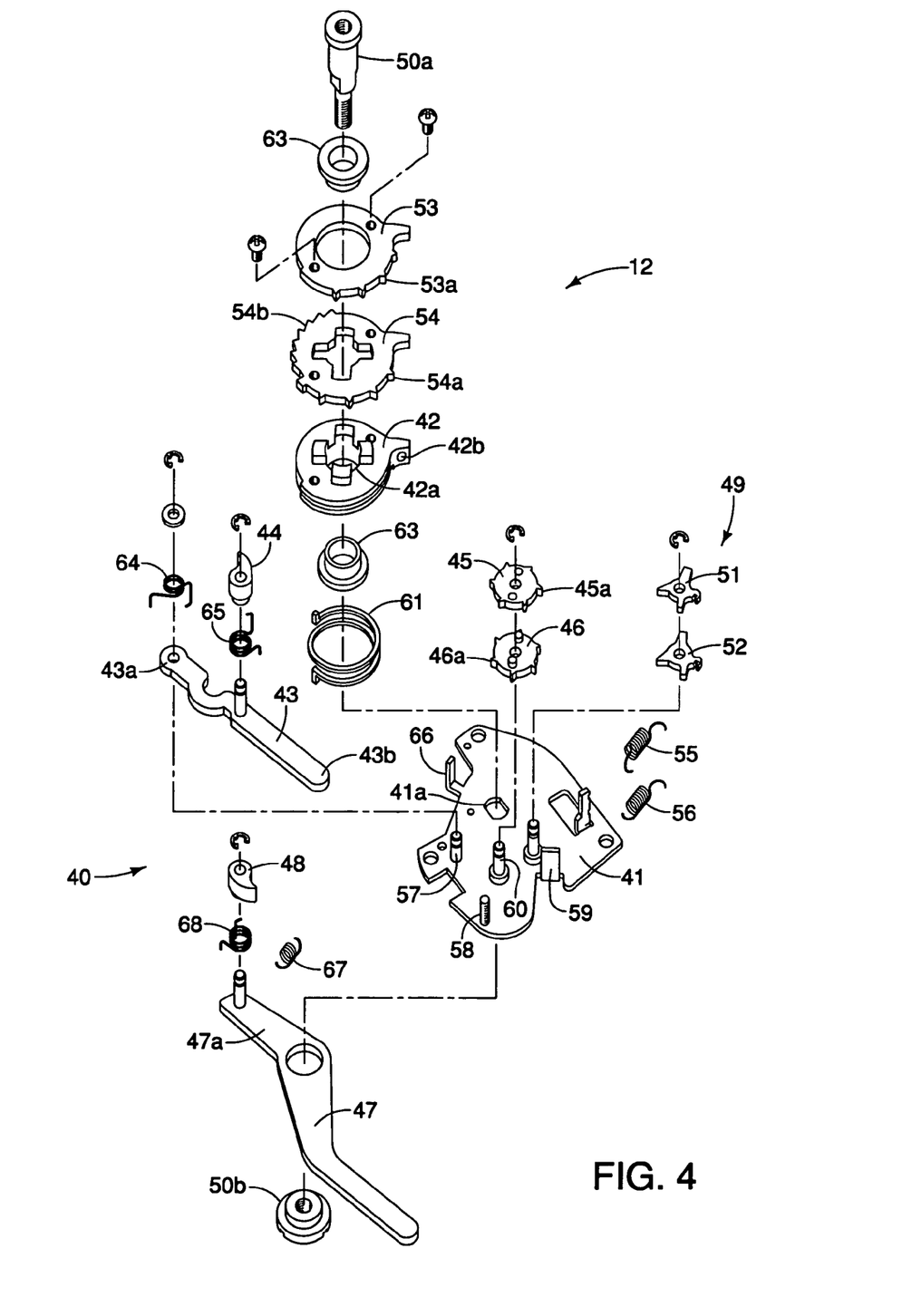
FIG. 4 is an exploded perspective view of selected internal parts of the bicycle shifting mechanism for the bicycle shifter illustrated in FIG. 2 in accordance with the present invention.
Figure 5:
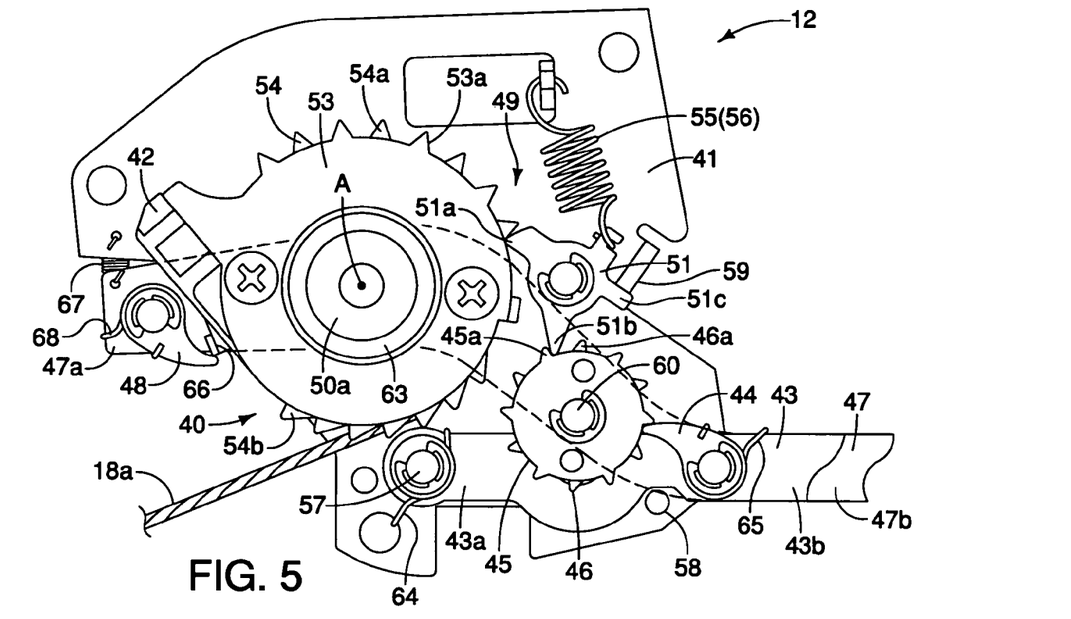
FIG. 5 is a simplified top plan view of selected internal parts of the bicycle shifting mechanism for the bicycle shifter illustrated in FIG. 2, with operating members (shift levers) in their rest positions.

As best seen in FIGS. 3 and 4, the bicycle shifting mechanism 40 basically includes a mounting plate 41, a wire takeup member 42, a release lever 43 with a driving or release pawl 44, a first release ratchet member or wheel 45, a second release ratchet member or wheel 46, a winding lever 47 with a driving or winding pawl 48 and a positioning mechanism 49. The wire takeup member 42 and the winding lever 47 are movably mounted to the mounting plate 41 by a main pivot shaft formed by a mounting bolt 50a and a mounting nut 50b, while the release lever 43 is pivotally mounted to the mounting plate 41 about an axis that is offset from a rotational axis A defined by the main pivot shaft (i.e., the mounting bolt 50a and the mounting nut 50b).

Basically, the release lever 43 and the winding lever 47 are selectively operated (pushed) by the rider to either release or wind the wire takeup member 42 via the positioning mechanism 49 as discussed below. The release lever 43, the driving or release pawl 44 and the first and second release ratchet wheels 45 and 46 basically form a wire releasing mechanism. Preferably, the release lever 43 and the winding lever 47 are trigger action type levers that are pushed to perform a shifting operation and that automatically returns to their normal rest position upon releasing the levers 43 and 47.

Still referring to FIGS. 3 and 4, the positioning mechanism 49 basically includes a first movable positioning member or pawl 51, a second movable positioning member or pawl 52, a first positioning ratchet wheel 53, a second positioning ratchet wheel 54, a first pawl biasing member 55 and a second pawl biasing member 56. The first and second positioning ratchet wheels 53 and 54 are preferably metal plate like members that are fixedly coupled together and to the wire takeup member 42 so that they all rotate together. Generally speaking, the positioning mechanism 49 is configured and arranged to selectively maintain the wire takeup member 42 in one of a plurality of predetermined shift positions in response to movement of the release lever 43 from the rest position to an actuating position. Depending on the amount of movement of the release lever 43, the positioning mechanism 49 will cause the wire takeup member 42 to move one or more gear shift positions in a single progressive movement of the release lever 43 from the rest position to one of the actuating positions.

As best seen in FIGS. 5 to 8, the first and second movable positioning pawls 51 and 52 are preferably metal plate like members that are pivotally mounted to the mounting plate 41 to selectively release the first and second positioning ratchet wheels 53 and 54, respectively, in response to movement of the release lever 43 from the rest position to an actuating position. Of course, this releasing operation also releases the wire takeup member 42 so that the inner wire 18a is unwound from the wire takeup member 42. The first and second movable positioning pawls 51 and 52 are normally maintained in contact with the first and second positioning ratchet wheels 53 and 54, respectively, by the first and second pawl biasing members 55 and 56. In other words, the first and second movable positioning pawls 51 and 52 are biased by the first and second pawl biasing members 55 and 56, respectively, toward engagement positions for maintaining the wire takeup member 42 in one of a plurality of predetermined shift positions. Thus, the first and second movable positioning pawls 51 and 52 are separately movable relative to each other to alternately retain and release the wire takeup member 42 via engagement with the first and second positioning ratchet wheels 53 and 54 as explained below.

Figure 6:
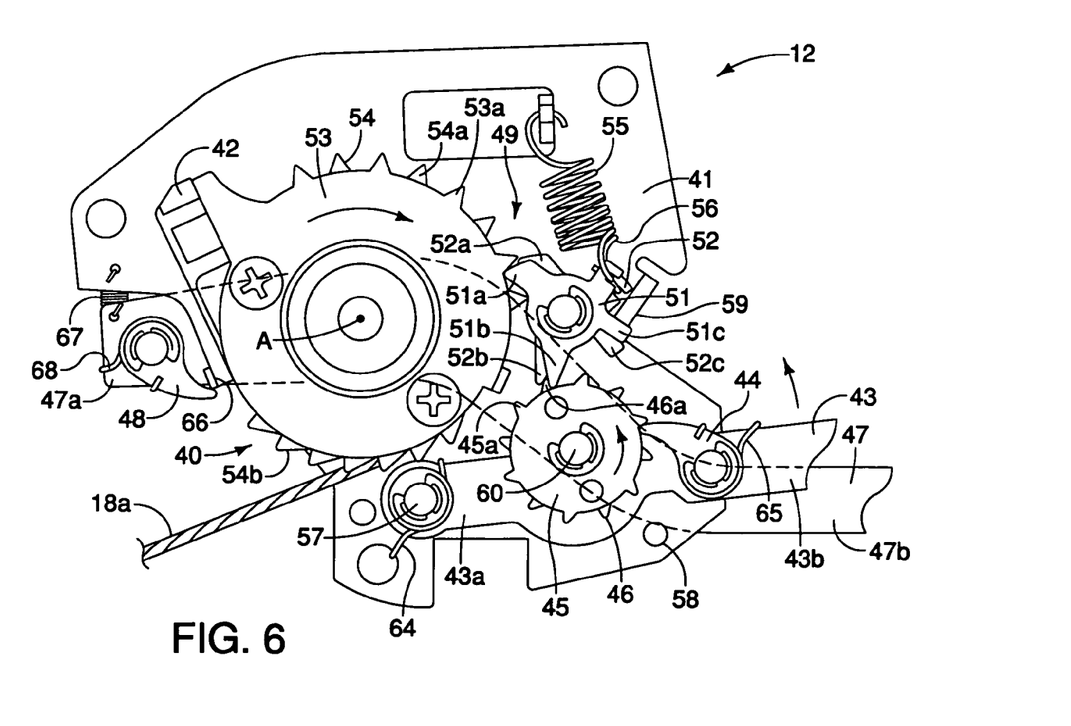
FIG. 6 is a simplified top plan view of selected internal parts of the bicycle shifting mechanism for the bicycle shifter illustrated in FIG. 2, with the winding lever in the rest position and the release lever in an intermediate actuating position to perform a single gear shifting operation.
Figure 7:
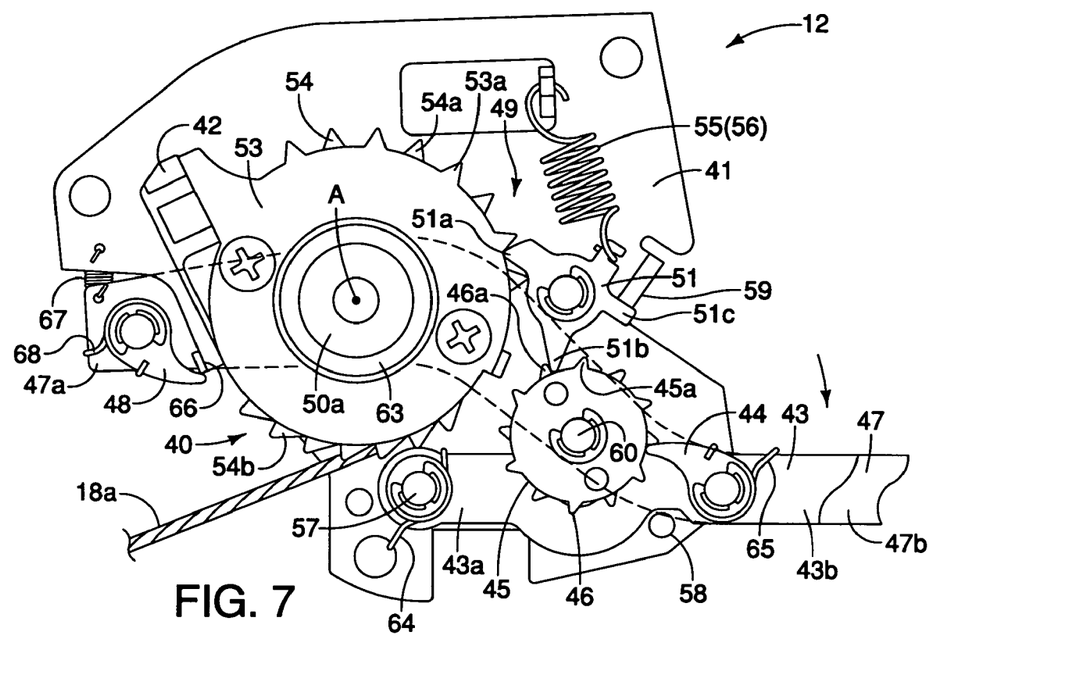
FIG. 7 is a simplified top plan view of selected internal parts of the bicycle shifting mechanism for the bicycle shifter illustrated in FIG. 2, with the winding lever in the rest position and the release lever returned to the rest position.
Figure 8:
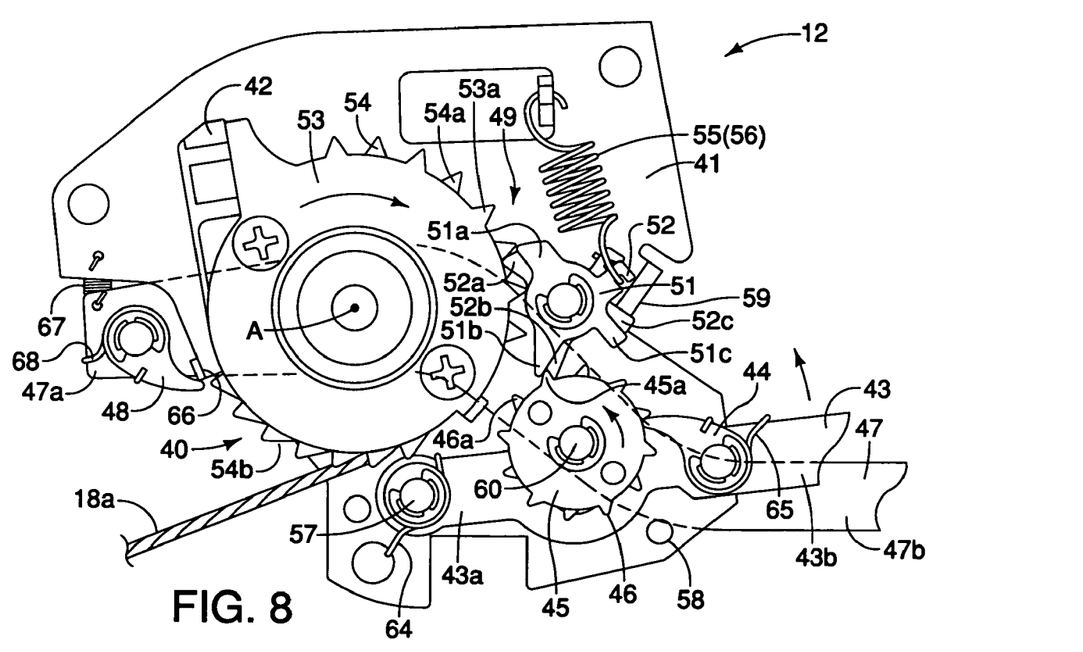
FIG. 8 is a simplified top plan view of selected internal parts of the bicycle shifting mechanism for the bicycle shifter illustrated in FIG. 2, with the winding lever in the rest position and the release lever in an intermediate actuating position to perform a single gear shifting operation.
Figure 9:
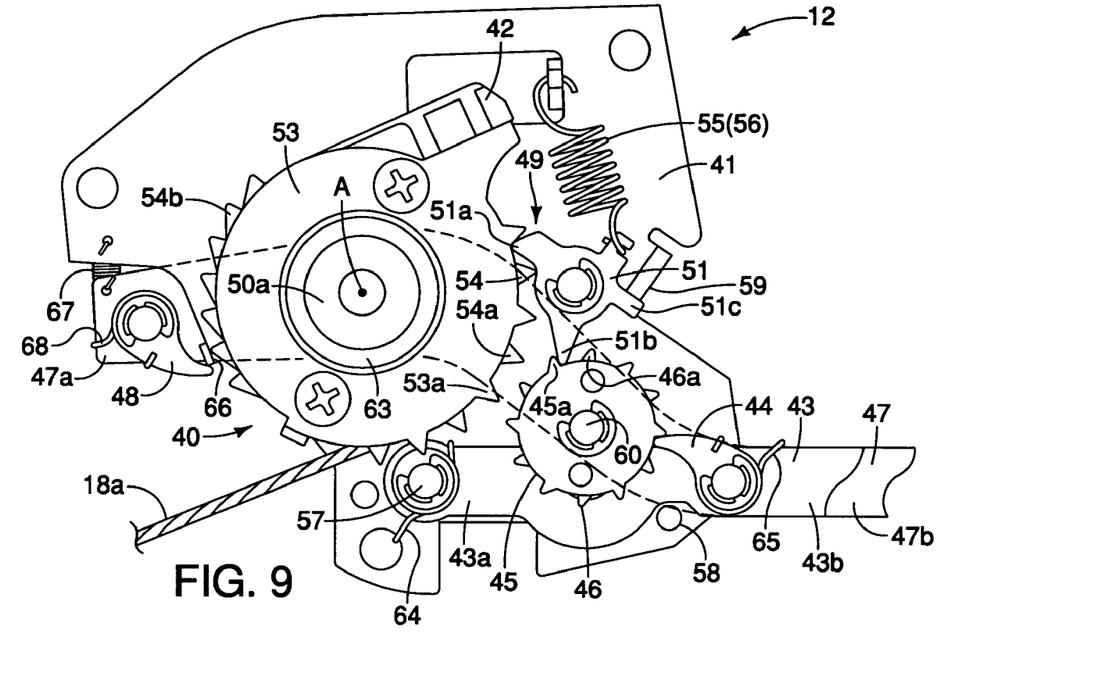
FIG. 9 is a simplified top plan view of selected internal parts of the bicycle shifting mechanism for the bicycle shifter illustrated in FIG. 2, with operating members (shift levers) in their rest positions.

In particular, as best seen in FIGS. 6 and 8, the first movable positioning pawl 51 has a position maintaining tooth 51a, a position release tooth 51b and a stop tooth 51c. Similarly, the second movable positioning pawl 52 has a position maintaining tooth 52a, a position release tooth 52b and a stop tooth 52c. The first position maintaining tooth 51a is configured and arranged to engage the first positioning ratchet wheel 53 to selectively retain the wire takeup member 42 in one of a plurality of first predetermined shift positions as seen in FIGS. 6 and 7. The second position maintaining tooth 52a is configured and arranged to engage the second positioning ratchet wheel 54 to selectively retain the wire takeup member 42 in one of a plurality of second predetermined shift positions as seen in FIG. 8. The first predetermined shift positions of the wire takeup member 42 alternate with respect to the second predetermined shift positions of the wire takeup member 42. In response to movement of the release lever 43 from the rest position to an actuating position, the first and second position release teeth 51b and 52b are alternately engaged by the first and second release ratchet wheels 45 and 46, respectively, such that the first and second movable positioning pawls 51 and 52 are alternately pivoted to alternately release and retain the first and second positioning ratchet wheels 53 and 54, respectively, as best seen in FIGS. 5 to 8.

As mentioned above, the first and second positioning ratchet wheels 53 and 54 are fixedly coupled together and to the wire takeup member 42 so that they all rotate together. In the illustrated embodiment, two screws are used to secure the first and second positioning ratchet wheels 53 and 54 onto the wire takeup member 42. Of course, other securing arrangements can be used as needed and/or desired.

The first positioning ratchet wheel 53 is provided with a plurality of first teeth that form a first toothed segment 53a. The first teeth of the first toothed segment 53a are configured and arranged to be selectively engaged by the first position maintaining tooth 51a of the first movable positioning pawl 51 to selectively retain the wire takeup member 42 in one of the first predetermined shift positions. Preferably, the first teeth of the first toothed segment 53a are spaced apart along the peripheral edge of the first positioning ratchet wheel 53 with the spacing between adjacent ones of the first teeth of the first toothed segment 53a being equal. While the first toothed segment 53a of the first positioning ratchet wheel 53 is provided with four teeth, it will be apparent to those skilled in the art from this disclosure that fewer or more teeth can be used as needed and/or desired.

The second positioning ratchet wheel 54 is provided with a plurality of second teeth that form a second toothed segment 54a, and a plurality of third teeth that form a third toothed segment 54b. The second teeth of the second toothed segment 54a are configured and arranged to be selectively engaged by the second position maintaining tooth 52a of the second movable positioning pawl 52 to selectively retain the wire takeup member 42 in one of the second predetermined shift positions. The third teeth of the third toothed segment 54b are configured and arranged to be selectively engaged by the winding pawl 48 to rotate the wire takeup member 42 in response to movement of the winding lever 47 from the rest position to an actuating position.

Preferably, the second teeth of the second toothed segment 54a are spaced apart along the peripheral edge of the second positioning ratchet wheel 54 with the spacing between adjacent ones of the second teeth of the first toothed segment 54a being equal. While the second toothed segment 54a of the second positioning ratchet wheel 54 is provided with four teeth, it will be apparent to those skilled in the art from this disclosure that fewer or more teeth can be used as needed and/or desired. The third teeth of the third toothed segment 54b are winding teeth that are spaced apart along the peripheral edge of the second positioning ratchet wheel 54. While the third teeth of the third toothed segment 54b of the second positioning ratchet wheel 54 is provided with seven teeth, it will be apparent to those skilled in the art from this disclosure that fewer or more teeth can be used as needed and/or desired.

When the first and second positioning ratchet wheels 53 and 54 are secured together on the wire takeup member 42, the first toothed segment 53a lies in a first plane and the second toothed segment 54a lies in a second plane that is offset and parallel to the first plane. Furthermore, when the first and second positioning ratchet wheels 53 and 54 are secured together on the wire takeup member 42, the relative rotational orientations of the first and second positioning ratchet wheels 53 and 54 are such that the first teeth of the first toothed segment 53a are arranged to alternate with respect to the second teeth of the second toothed segment 54a. In other words, the first and second movable positioning pawls 51 and 52 are configured and arranged to alternately engage and disengage one of the first and second toothed segments 53a and 54a, respectively, as the first and second movable positioning pawls 51 and 52 are moved to perform a shifting operation between sequential shift positions of the predetermined shift positions. Accordingly, the first and second movable positioning pawls 51 and 52 alternately engage and disengage one of the first and second toothed segments 53a and 54a, respectively, to form a ratchet arrangement therebetween.

The mounting plate 41 is fixedly mounted to the housing 30 via fasteners or screws (not shown). The mounting plate 41 rotatably supports the wire takeup member 42 about a rotational axis A. In particular, the mounting plate 41 has a mounting hole 41a that receives the mounting bolt 50a for securing the wire takeup member 42 to the mounting plate 41 in a rotatable manner. The release lever 43 is pivotally mounted to the mounting plate 41 for pivotal movement between a rest position and a fully actuating position in which multiple gear shifts normally occur. In particular, the mounting plate 41 has a pivot pin 57 for pivotally supporting the release lever 43 on the mounting plate 41. Movement of the release lever 43 to the rest position is limited by a stop or abutment 58 that is formed on the mounting plate 41. In the illustrated embodiment, the abutment 58 is formed by a screw that is threaded into a hole in the mounting plate 41. The mounting plate 41 also has a stop or abutment 59 that limits the pivotally movements of the first and second movable positioning pawls 51 and 52 as explained below.

The first and second release ratchet wheels 45 and 46 are preferably metal plate like members that are rotatably mounted to the mounting plate 41 by a pivot pin 60. As explained below, the first and second release ratchet wheels 45 and 46 are fixed together and are rotated in response to movement of the release lever 43 from the rest position to an actuating position. In particular, movement of the release lever 43 cause the release pawl 44 to rotate the first and second release ratchet wheels 45 and 46 in a counterclockwise direction as viewed from a top plan view. When the release lever 43 returns to the rest position from an actuating position, the first and second release ratchet wheels 45 and 46 remain stationary.

Generally speaking, the first release ratchet wheel 45 is operatively arranged to move the first movable positioning pawl 51 between an engagement position and a disengagement position as seen in FIG. 8. Similarly, the second release ratchet wheel 46 is operatively arranged to move the second movable positioning pawl 52 between an engagement position and a disengagement position as seen in FIG. 6. Thus, this rotation of the first and second release ratchet wheels 45 and 46 causes the first and second movable positioning pawls 51 and 52 to be alternately pivoted against the biasing forces of the first and second pawl biasing members 55 and 56, respectively. This alternating pivoting of the first and second movable positioning pawls 51 and 52 causes the first and second positioning ratchet wheels 53 and 54 to be alternately released such that the wire takeup member 42 can rotate in the release (clockwise) direction under the urging force of the wire takeup spring 61 as seen in FIGS. 6 and 8. In particular, when the first movable positioning pawl 51 disengages from the first positioning ratchet wheel 53, the wire takeup member 42 together with both of the first and second positioning ratchet wheels 53 and 54 rotate in the release (clockwise) direction under the urging force of the wire takeup spring 61, until the second movable positioning pawl 52 catches the second positioning ratchet wheel 54 to perform a single gear shifting operation. Similarly, when second movable positioning pawl 52 disengages from the second positioning ratchet wheel 54, the wire takeup member 42 together with both of the first and second positioning ratchet wheels 53 and 54 rotate in the release (clockwise) direction under the urging force of the wire takeup spring 61, until the first movable positioning pawl 51 catches the first positioning ratchet wheel 53 to perform a single gear shifting operation. Thus, the release lever 43, the driving or release pawl 44 and the first and second release ratchet wheels 45 and 46 basically form a wire releasing mechanism that is configured and arranged to alternately move the first and second movable positioning pawls 51 and 52 such that the first and second movable positioning wheels 53 and 54 are alternately engaged and disengaged from the first and second movable positioning pawls 51 and 52, respectively, in response to the rotation of the first and second release ratchet wheels 45 and 46. In this manner, the release lever 43 is configured and arranged to selectively release the wire takeup member 42 to cause the wire takeup member 42 to rotate one shift position of the predetermined shift positions when the release lever 43 is moved from a rest position by a first predetermined amount and to cause the wire takeup member 42 to rotate two consecutive shift positions of the predetermined shift positions when the release lever is moved from a rest position by a second predetermined amount in a single shift operation.

More specifically, the first release ratchet wheel 45 is provided with a plurality of first teeth that form a first toothed segment 45a. Preferably, the first teeth of the first toothed segment 45a are spaced apart around the circumferential edge of the first release ratchet wheel 45 with the spacing between adjacent ones of the first teeth of the first toothed segment 45a being equal. The second release ratchet wheel 46 is provided with a plurality of second teeth that form a second toothed segment 46a. Preferably, the second teeth of the second toothed segment 46a are spaced apart around the circumferential edge of the second release ratchet wheel 46 with the spacing between adjacent ones of the second teeth of the second toothed segment 46a being equal.

The first and second teeth of the first toothed segments 45a and 46a are configured and arranged to be selectively engaged by the release pawl 44 to rotate the first and second release ratchet wheels 45 and 46 in a counterclockwise direction as seen in the Figures. Rotation of the first and second release ratchet wheels 45 and 46 causes the first teeth of the first toothed segment 45a to selectively engage, one at a time, the position release tooth 51b of the first movable positioning pawl 51, and causes the second teeth of the second toothed segment 46a to selectively engage, one at a time, the position release tooth 52b of the second movable positioning pawl 52. Thus, the engagement of one of the first teeth of the first toothed segment 45a with the position release tooth 51b of the first movable positioning pawl 51 causes the first positioning pawl 51 to pivot. This pivotal movement of the first movable positioning pawl 51 results in the first position maintaining tooth 51a of the first movable positioning pawl 51 being moved out of engagement with one of the first teeth of the first toothed segment 53a of the first positioning ratchet wheel 53. Once the first position maintaining tooth 51a of the first movable positioning pawl 51 releases one of the first teeth of the first toothed segment 53a of the first positioning ratchet wheel 53, then the first and second positioning ratchet wheels 53 and 54 can rotate together with the wire takeup member 42 by one gear shift position. In particular, when the first movable positioning pawl 51 releases the first positioning ratchet wheel 53, the first and second positioning ratchet wheels 53 and 54 can freely rotate together with the wire takeup member 42 under an urging force applied to the wire takeup member 42 by the wire takeup biasing member or spring 61. Rotation of the wire takeup member 42 is stopped by the second position maintaining tooth 52a of the second movable positioning pawl 52 engaging one of the second teeth of the second toothed segment 54a of the second positioning ratchet wheel 54.

Similarly, the engagement of one of the second teeth of the second toothed segment 46a with the position release tooth 52b of the second movable positioning pawl 52 causes the second movable positioning pawl 52 to pivot. This pivotal movement of the second movable positioning pawl 52 results in the second position maintaining tooth 52a of the second movable positioning pawl 52 being moved out of engagement with one of the second teeth of the second toothed segment 54a of the second positioning ratchet wheel 54. Once the second position maintaining tooth 52a of the second movable positioning pawl 52 releases one of the second teeth of the second toothed segment 54a of the second positioning ratchet wheel 54, then the first and second positioning ratchet wheels 53 and 54 can rotate together with the wire takeup member 42 by one gear shift position. In particular, when the second movable positioning pawl 52 releases the second positioning ratchet wheel 54, the first and second positioning ratchet wheels 53 and 54 can freely rotate together with the wire takeup member 42 under an urging force applied to the wire takeup member 42 by the wire takeup biasing member or spring 61. Rotation of the wire takeup member 42 is stopped by the first position maintaining tooth 51a of the first movable positioning pawl 51 engaging one of the first teeth of the first toothed segment 53a of the first positioning ratchet wheel 53.

As best seen in FIG. 4, the wire takeup member 42 is a conventional type wire takeup spool in which the inner wire 18a is round along the peripheral edge surface of the wire takeup member 42 as the wire takeup member 42 is rotated in a counterclockwise direction. Thus, the wire takeup member 42 is configured and arranged to rotate about the rotational axis A in a clockwise direction during a wire releasing operation and a counterclockwise direction during a wire winding operation as seen in FIGS. 5 to 11. The wire takeup biasing member or spring 61 is operatively coupled to the wire takeup member 42 to apply an urging force on the wire takeup member 42 in a first (clockwise) rotational direction. The wire takeup spring 61 is preferably a torsion spring having a first end attached to the wire takeup member 42 and a second end coupled to the mounting plate 41. The wire takeup spring 61 applies a biasing force to urge the wire takeup member 42 in the clockwise direction as seen in FIGS. 5-11.

Thus, the wire takeup member 42 has a center opening 42a that is rotatably mounted on the mounting bolt 50a. Preferably, the center opening 42a has a pair of step shaped washers 63 provided therein to form a smooth cylindrical metal insert between the wire takeup member 42 and the mounting bolt 50a. The peripheral edge of the wire takeup member 42 has a wire attachment opening 42b for attaching the inner wire 18a of the shift cable 18 thereto. Also, the bottom of the wire takeup member 42 has a hole for attaching the wire takeup spring 61 thereto. Thus, the wire takeup spring 61 biases the wire takeup member 42 in a clockwise direction, i.e., the shift releasing direction. When the step shaped washers 63 are inserted into the center opening 42a of the wire takeup member 42, the bottom one of the step shaped washers 63 together with an annular ring formed on the bottom surface of the wire takeup member 42 form a shape between the mounting plate 41 and the wire takeup member 42 so that the wire takeup spring 61 is not compressed in the axial direction when the mounting bolt 50a and the mounting nut 50b are tightened together.

The release lever 43 has a first (inner) end 43a pivotally supported on the mounting plate 41 by the pivot pin 57 for pivotally movement, and a second (outer) end 43b that projects out of the housing 30 for the rider to operate. Thus, the release lever 43 is configured and arranged to pivot about a pivot axis that is offset from the rotational axis A of the wire takeup member 42 such that the release lever 43 pivots from the rest position to alternately operate the first and second movable positioning pawls 51 and 52 as explained below.

As mention above, preferably, the release lever 43 is a trigger action type lever that is pushed to perform a shifting operation and that automatically returns to its normal rest position upon releasing the release lever 43. Thus, the release lever 43 is biased to a rest position (i.e., against the abutment 58) by a biasing member or spring 64. The release pawl 44 on the release lever 43 is configured and arranged to alternately operate the first and second release ratchet wheels 45 and 46 in response to the pivotal movement of the release lever 43. In particular, movement of the release lever 43 from the rest position causes the release pawl 44 to rotate the first and second release ratchet wheels 45 and 46 together in a counterclockwise direction as seen from a top plan view. The release pawl 44 is urged into engagement with the first and second release ratchet wheels 45 and 46 by a biasing member or spring 65 so that the release pawl 44 remains in contact with the first and second release ratchet wheels 45 and 46.

Now the winding lever 47 will be explained in greater detail with reference to FIGS. 4 and 9 to 12. Basically, the winding lever 47 is pivotally mounted to the mounting plate 41 on the mounting nut 50b for pivotal movement from its rest position to a single gear shift actuating position or one of several multiple gear shift actuating positions in which multiple gear shifts occur. Normally, as seen in FIGS. 5 to 9, the winding pawl 48 of the winding lever 47 is held out of engagement from the positioning mechanism 49 so that it does not interfere with the rotation of the takeup member 42 during a releasing operation. Specifically, the mounting plate 41 has a winding pawl holding projection or tab 66 that holds the winding pawl 48 out of engagement from the positioning mechanism 49 when the winding lever 47 is in the rest position.

Figure 12:
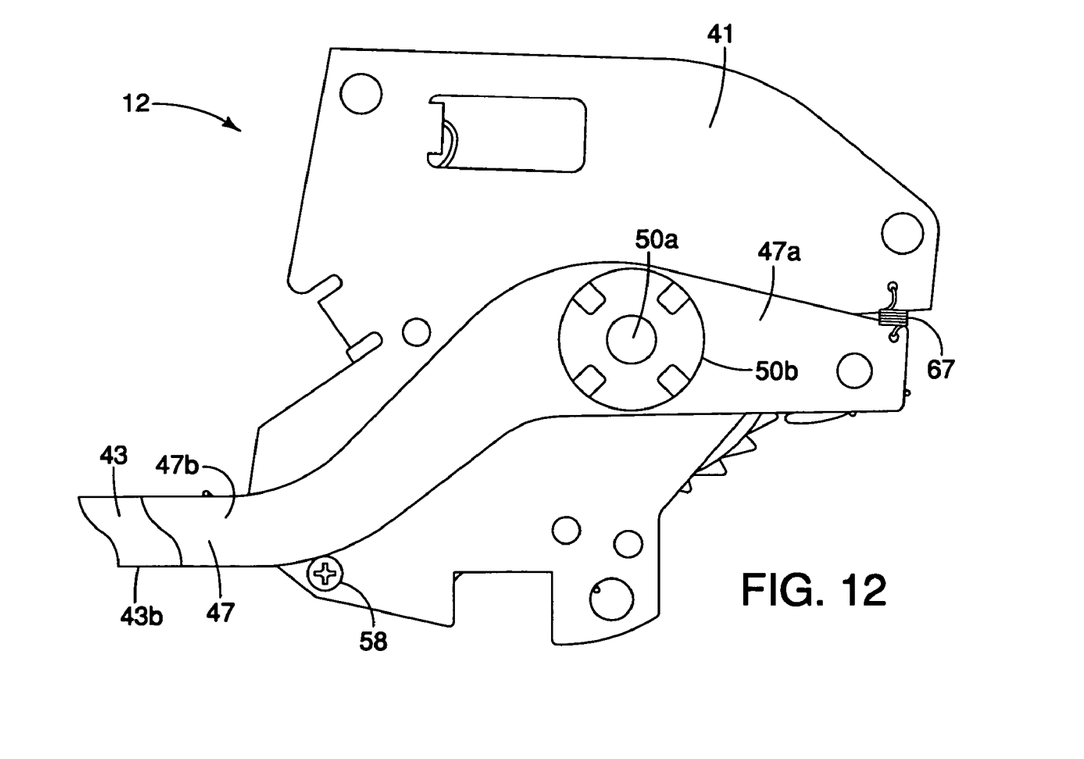
FIG. 12 is a simplified bottom plan view of selected internal parts of the bicycle shifting mechanism for the bicycle shifter illustrated in FIG. 2, with operating members (shift levers) in their rest positions.

As seen in FIG. 12, the winding lever 47 has a first or inner end 47a with the winding pawl pivotally mounted thereon, and a second or outer end 47b that projects out of the housing 30 for the rider to operate. As mention above, preferably, the winding lever 47 is a trigger action type lever that is pushed to perform a shifting operation and that automatically returns to its normal rest position upon releasing the winding lever 47. Thus, the winding lever 47 is biased to a rest position (i.e., against the abutment 58) by a biasing member or spring 67.

Figure 10:
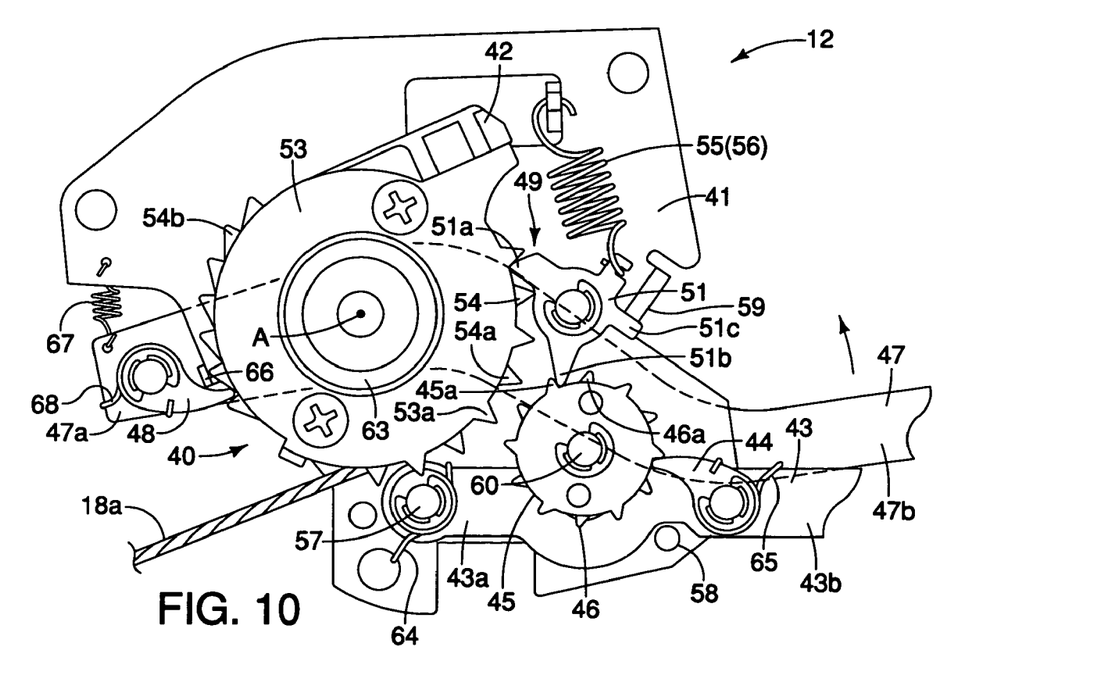
FIG. 10 is a simplified top plan view of selected internal parts of the bicycle shifting mechanism for the bicycle shifter illustrated in FIG. 2, with the winding lever in an intermediate actuating position (prior to movement of the takeup member) and the release lever in the rest position.
Figure 11:
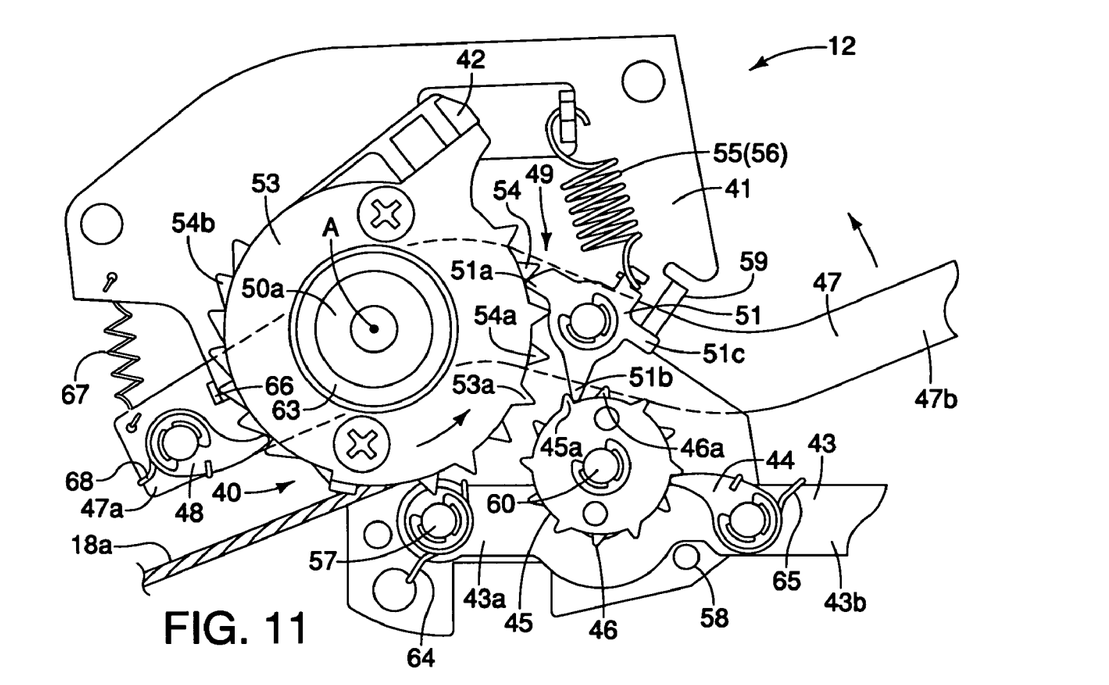
FIG. 11 is a simplified top plan view of selected internal parts of the bicycle shifting mechanism for the bicycle shifter illustrated in FIG. 2, with the winding lever in a further actuating position to perform a single gear shifting operation and the release lever in the rest position.

As seen in FIGS. 10 and 11, the winding pawl 48 on the winding lever 47 is configured and arranged to selectively engage the third teeth of the third toothed segment 54b of the second positioning ratchet wheel 54 in response to the pivotal movement of the winding lever 47. As mentioned above, normally, the winding pawl 48 of the winding lever 47 rests on the winding pawl holding projection or tab 66 so that the winding pawl 48 is held out of engagement from the third teeth of the third toothed segment 54b of the second positioning ratchet wheel 54. In this way, the winding pawl 48 does not interfere with the rotation of the takeup member 42 during a releasing operation. During a winding operation, movement of the winding lever 47 from the rest position causes the winding pawl 48 to move off the winding pawl holding tab 66 due to the urging force of the torsion spring 68 and engage one of the third teeth of the third toothed segment 54b of the second positioning ratchet wheel 54 as seen in FIG. 10. Further movement of the winding lever 47 causes the wire takeup member 42 to rotate as the winding pawl 48 rotates the second positioning ratchet wheel 54 in a counterclockwise direction as seen in FIG. 11. Once the winding lever 47 is released, the spring 67 urges the winding lever 47 back to its rest position. Thus, the winding pawl 48 ratchets over the third teeth of the third toothed segment 54b of the second positioning ratchet wheel 54 and rests on the winding pawl holding projection or tab 66.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

What is claimed is:

1. A bicycle shifting mechanism comprising:
a wire takeup member configured and arranged to rotate about a rotational axis;
a positioning mechanism selectively maintaining the takeup member in one of a plurality of predetermined shift positions,
the positioning mechanism including a first movable positioning member, a second movable positioning member separately movable relative to the first positioning member, a first toothed segment that moves with the takeup member, and a second toothed segment that moves with the takeup member,
the first and second movable positioning members alternately engaging and disengaging one of the first and second toothed segments, respectively, as the first and second movable positioning members are moved during performance of a single shifting operation between sequential shift positions of the predetermined shift positions, the first and second movable positioning members both engaging respective first and second toothed segments in a single shifting direction during the single shifting operation; and
a wire releasing mechanism including engaging toothed segments for alternately engaging the first and second movable positioning members, the engaging toothed segments being rotatably supported to rotate around a rotational axis offset from the rotational axis of the wire takeup member.

2. The bicycle shifting mechanism according to claim 1, wherein
the first and second movable positioning members include pivotally mounted positioning pawls that alternately engage and disengage one of the first and second toothed segments, respectively, to form a ratchet arrangement therebetween.

3. The bicycle shifting mechanism according to claim 1, wherein
the first toothed segment lies in a first plane and the second toothed segment lies in a second plane that is offset and parallel to the first plane.

4. A bicycle shifting mechanism comprising:
a wire takeup member configured and arranged to rotate about a rotational axis; and a positioning mechanism selectively maintaining the takeup member in one of a plurality of predetermined shift positions by preventing rotation of the takeup member in a first rotational direction about the rotational axis,
the positioning mechanism including a first movable positioning member, a second movable positioning member separately movable relative to the first positioning member, a first toothed segment configured to that moves with the takeup member, and a second toothed segment configured-to that moves with the takeup member,
the first movable positioning member selectively engaging the first toothed segment to prevent rotation of the takeup member in the first rotational direction about the rotational axis, and does not engage the second toothed segment to prevent rotation of the takeup member in the first rotational direction about the rotational axis,
the second movable positioning member selectively engaging the second toothed segment to prevent rotation of the takeup member in the first rotational direction about the rotational axis, and does not engage the first toothed segment to prevent rotation of the takeup member in the first rotational direction about the rotational axis,
the first and second movable positioning members alternately engaging and disengaging engage and disengage the first and second toothed segments, respectively, as the first and second movable positioning members are moved to perform a shifting operation between sequential shift positions of the predetermined shift positions, with the first and second movable positioning members having a single axis of rotation disposed along a single axle about which the first and second movable positioning members independently rotate, and with the first and second movable positioning members being biased toward engagement positions for maintaining the takeup member in one the predetermined shift positions.

5. A bicycle shifting mechanism comprising:
a wire takeup member configured and arranged to rotate about a rotational axis; and
a positioning mechanism selectively maintaining the takeup member in one of a plurality of predetermined shift positions,
the positioning mechanism including a first movable positioning member, a second movable positioning member separately movable relative to the first positioning member, a first toothed segment that moves with the takeup member, and a second toothed segment that moves with the takeup member,
the first and second movable positioning members alternately engaging and disengaging one of the first and second toothed segments, respectively, as the first and second movable positioning members are moved during performance of a single shifting operation between sequential shift positions of the predetermined shift positions, the first and second movable positioning members both engaging respective first and second toothed segments in a single shifting direction during the single shifting operation; and
a releasing mechanism configured and arranged to alternately move the first and second movable positioning members during the single shifting operation such that the first and second movable positioning members are alternately engaged and disengaged with one of the first and second toothed segments, respectively.

6. The bicycle shifting mechanism according to claim 5, wherein
the releasing mechanism includes a first ratchet wheel operatively arranged to move the first movable positioning member between an engagement position and a disengagement position, and a second ratchet wheel operatively arranged to move the second movable positioning member between an engagement position and a disengagement position.

7. The bicycle shifting mechanism according to claim 6, wherein
the releasing mechanism includes a release lever with a driving pawl that is configured and arranged to alternately operate the first and second ratchet wheels.

8. The bicycle shifting mechanism according to claim 6, wherein
the releasing mechanism includes a release lever that is configured and arranged to pivot about a pivot axis that is offset from the rotational axis of the wire takeup member.

9. The bicycle shifting mechanism according to claim 7, wherein the release lever is configured and arranged to selectively release the wire takeup member to cause the wire takeup member to rotate one shift position of the predetermined shift positions when the release lever is moved from a rest position by a first predetermined amount and to cause the wire takeup member to rotate two consecutive shift positions of the predetermined shift positions when the release lever is moved from a rest position by a second predetermined amount in a single shift operation.

10. The bicycle shifting mechanism according to claim 1, further comprising
a biasing member operatively coupled to the wire takeup member to apply an urging force on the wire takeup member in a first rotational direction with the first and second movable positioning members selectively engaging the first and second toothed segments to prevent rotation in the first rotational direction against the urging force of the biasing member.

11. A bicycle shifting mechanism comprising:
a wire takeup member configured and arranged to rotate about a rotational axis;
a positioning mechanism to selectively maintaining the takeup member in one of a plurality of predetermined shift positions,
the positioning mechanism including a first movable positioning member, a second movable positioning member separately movable relative to the first positioning member, a first toothed segment that moves with the takeup member, and a second toothed segment that moves with the takeup member,
the first and second movable positioning members alternately engaging and disengaging one of the first and second toothed segments, respectively, as the first and second movable positioning members are moved during performance of a single shifting operation between sequential shift positions of the predetermined shift positions, the first and second movable positioning members both engaging respective first and second toothed segments in a single shifting direction during the single shifting operation; and
a release lever pivotally arranged to pivot about a pivot axis that is offset from the rotational axis of the wire takeup member such that the release lever pivots from a rest position to operate the first and second movable positioning members during the single shifting operation.

12. The bicycle shifting mechanism according to claim 1, further comprising
a winding lever with a winding pawl that is configured and arranged to engage a third toothed segment configured to move with the takeup member such that movement of the winding lever rotates the takeup member.

13. A bicycle shifting mechanism comprising:
a wire takeup member configured and arranged to rotate about a rotational axis;
a positioning mechanism configured and arranged to selectively maintain the takeup member in one of a plurality of predetermined shift positions,
the positioning mechanism including a first movable positioning member, a second movable positioning member separately movable relative to the first positioning member, a first toothed segment configured to move with the takeup member, and a second toothed segment configured to move with the takeup member,
the first and second movable positioning members being configured and arranged to alternately engage and disengage one of the first and second toothed segments, respectively, as the first and second movable positioning members are moved to perform a shifting operation between sequential shift positions of the predetermined shift positions;
a wire releasing mechanism including engaging toothed segments for alternately engaging the first and second movable positioning members, the engaging toothed segments being supported to rotate around a rotational axis offset from the rotational axis of the wire takeup member; and
a winding lever with a winding pawl that is configured and arranged to engage a third toothed segment configured to move with the takeup member such that movement of the winding lever rotates the takeup member, the winding pawl and the third toothed segment forming a ratchet arrangement with the winding lever being biased to a rest position.

14. The bicycle shifting mechanism according to claim 13, wherein
the winding lever is configured and arranged to pivot about the rotational axis of the wire takeup member such that the winding lever pivots from a rest position to engage the third toothed segment.

* * * * *